Figure 1:
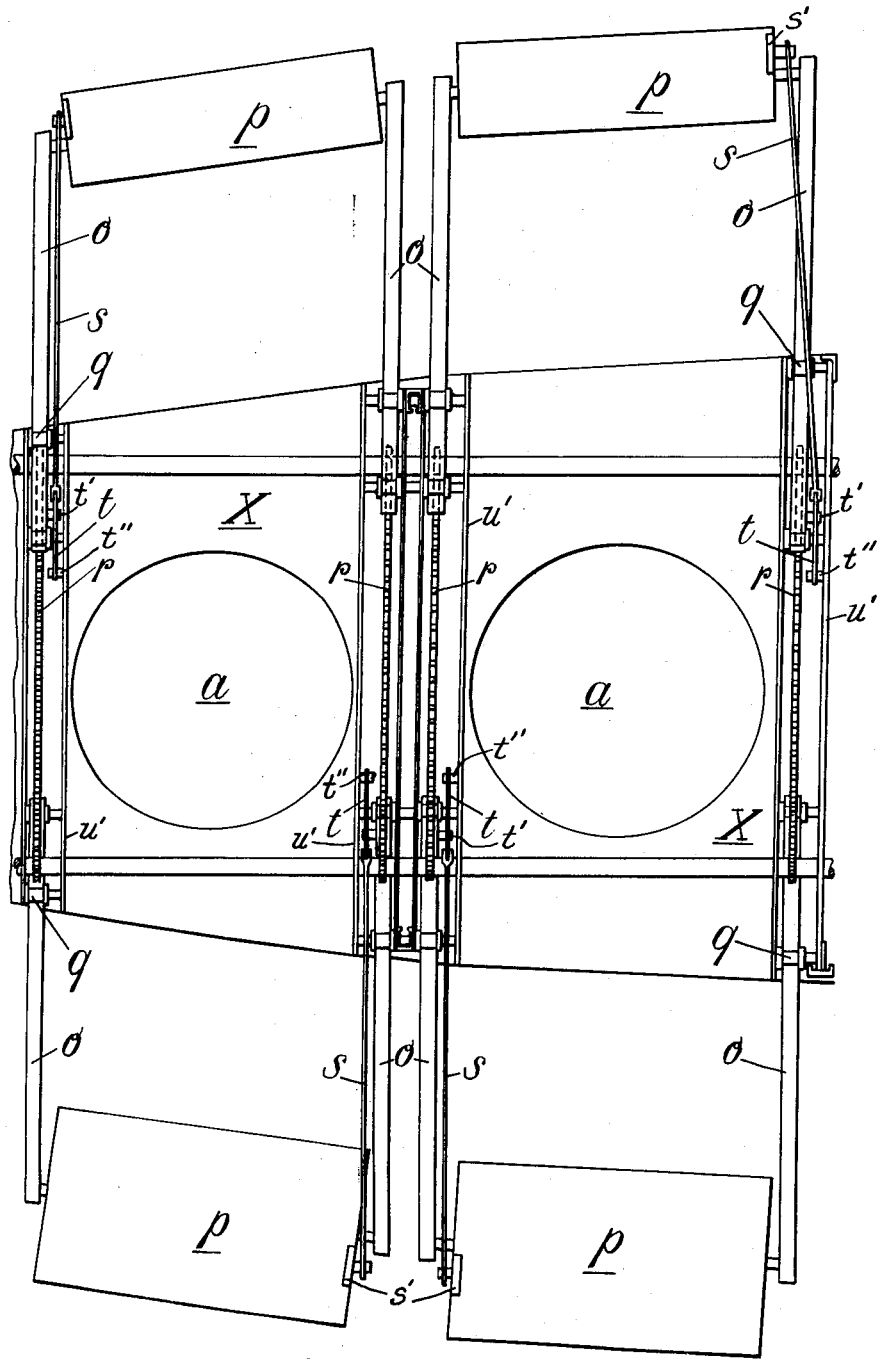

Nov. 8, 1955  S. D. DAVIES ET AL  2,723,091
AIR OR DIVE BRAKES FOR AIRCRAFT
Filed Jan. 22, 1952  6 Sheets-Sheet 1

Inventors
S.D. Davies
A.E. Briggs

Nov. 8, 1955 S. D. DAVIES ET AL 2,723,091
AIR OR DIVE BRAKES FOR AIRCRAFT
Filed Jan. 22, 1952 6 Sheets-Sheet 3

Inventors
S. D. Davies
A. E. Briggs

Nov. 8, 1955  S. D. DAVIES ET AL  2,723,091
AIR OR DIVE BRAKES FOR AIRCRAFT
Filed Jan. 22, 1952  6 Sheets-Sheet 5
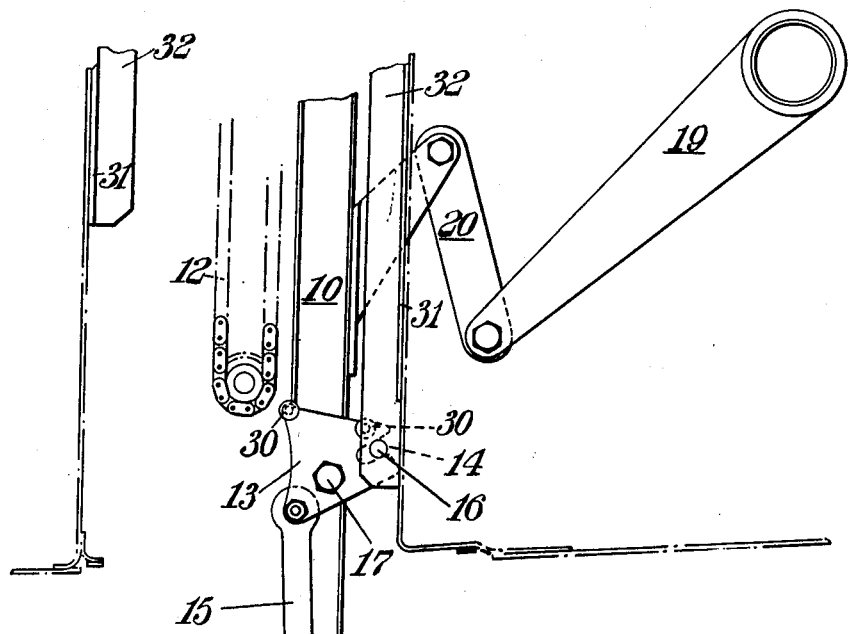
Fig.5
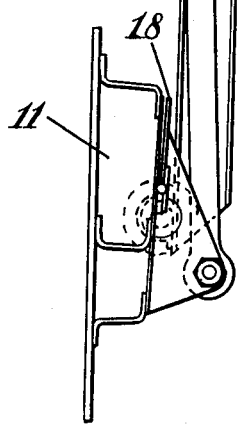
Inventors
S. D. Davies
A. E. Briggs
By Glascock Downing Seebold
Attys.

Inventors
S. D. Davies
A. E. Briggs

United States Patent Office 2,723,091
Patented Nov. 8, 1955

2,723,091

AIR OR DIVE BRAKES FOR AIRCRAFT

Stuart Duncan Davies and Arthur Edwin Briggs, Manchester, England, assignors to A. V. Roe & Company Limited, Manchester, England, a British company Application January 22, 1952, Serial No. 267,558

Claims priority, application Great Britain February 1, 1951

8 Claims. (Cl. 244—113)

This invention relates to air or dive brakes for aircraft and has for its object to provide improved air brakes carried by an aircraft wing and movable relative thereto and which require a minimum of storage space and power to operate them and which can be made so that they and their operating mechanism do not foul engine air intakes, fuel tanks, undercarriage stowage or other equipment which may be housed within the aircraft wings. A further object of the invention is to provide an air brake having a variable effective brake area which can be adapted to suit speed conditions so as to avoid imposing high loads on the aircraft structure when the brake is used at high speeds, whilst providing sufficient area to give the required braking force at low speeds.

The invention comprehends air or dive brake structures for aircraft and has for an object to provide an improved structural arrangement which includes rigid frame means each embodying components spaced apart and pivotally supporting a brake surface member, the frame means are mounted for movement in an in-line direction relative to the upper and lower wing surfaces and mechanism is included for extending and retracting the frame means relative to the wing surfaces and in which means are provided for turning the brake surface members about their pivots whereby these latter members can be in a plane substantially perpendicular to the wing surface or in a plane approximately parallel to said surface with the position of the brake surface member relative to the line of flight coupled with the amount of extent of the frame members determining the brake action.

It is a further specific object to provide an air brake arrangement for aircraft which includes associated with the wings and on opposite sides of the fuselage, at least one pair of rigid frame means, means mounting the frame means of each pair for movement in opposite directions so as to extend the frame means above and below the respective wing surfaces, each frame means carrying a pivotally mounted brake surface member at the outer portion thereof and means for turning the brake surface members about their pivots so as to dispose the brake surface members selectively depending on the amount of extension movement imparted to the frame means either parallel to the line of flight of the aircraft or approximately perpendicular to the wing surfaces.

The invention has for a further object to provide an air brake arrangement for aircraft which includes a plurality of frame means each including spaced side members with the frame means arranged in cooperative pairs with at least one pair on opposite sides of the aircraft fuselage for movement in parallel planes in opposite directions relative to the upper and lower wing surfaces. Between the side members of each frame means is pivotally mounted an air brake surface member, and means operatively interconnect the frame means of each pair for simultaneous movement relative to the wing surfaces and in response to the outward movement of the respective frame means, the respective brake surface members can pivot between a position flush with the upper and under-surface of the wing when stowed and retracted to a position substantially perpendicular to the wing when extended.

It is a specific object of the invention to operatively interconnect the frame means of each pair with an endless chain whereby they are simultaneously moved in opposite directions for extension and retraction.

The invention further comprehends means connected to each brake surface member to turn the same about their respective pivots including a link and means for changing the position of the link as the frame means are extended.

The invention further comprehends means mounting the frame means for movement in a straight line respectively outwardly and inwardly of the wing surfaces, a link means pivotally connected to each brake surface member, lever means coupled to the link means and carried by each frame means, a follower means carried by the lever means and cam slots for controlling the position of the followers and thus the respective lever and link means whereby the brake surface members are turned to a position at substantial right angles to the line of flight when the frame means are extended and the said brake surface members are turned to a position parallel to the line of flight and disposed flush with the wing surfaces when the frame means are retracted.

It is a further specific object to provide means for guiding the frame means for straight line movement out of and into the wing, means pivotally connected to at least one of the side frame members of each of the frame means and coupled by a link means to the respective brake surface members and an abutment in the path of movement of the means pivotally connected to the side frame members engaging the same when the frame means are moving outwardly to turn the same about its pivotal mounting to pivot brake surface mountings.

As a further specific object, the invention provides a pivotally mounted auxiliary flap on each brake surface member operative to move to a limited extent under wing pressure when the frame means are being moved out of the wing.

Further and more specific objects will be apparent from the following description taken in connection with the accompanying drawings, in which:

Figure 1 is a diagrammatic sectional view through part of an aircraft wing illustrating a brake mechanism in fully extended position for exerting maximum braking effect.

Figure 2:
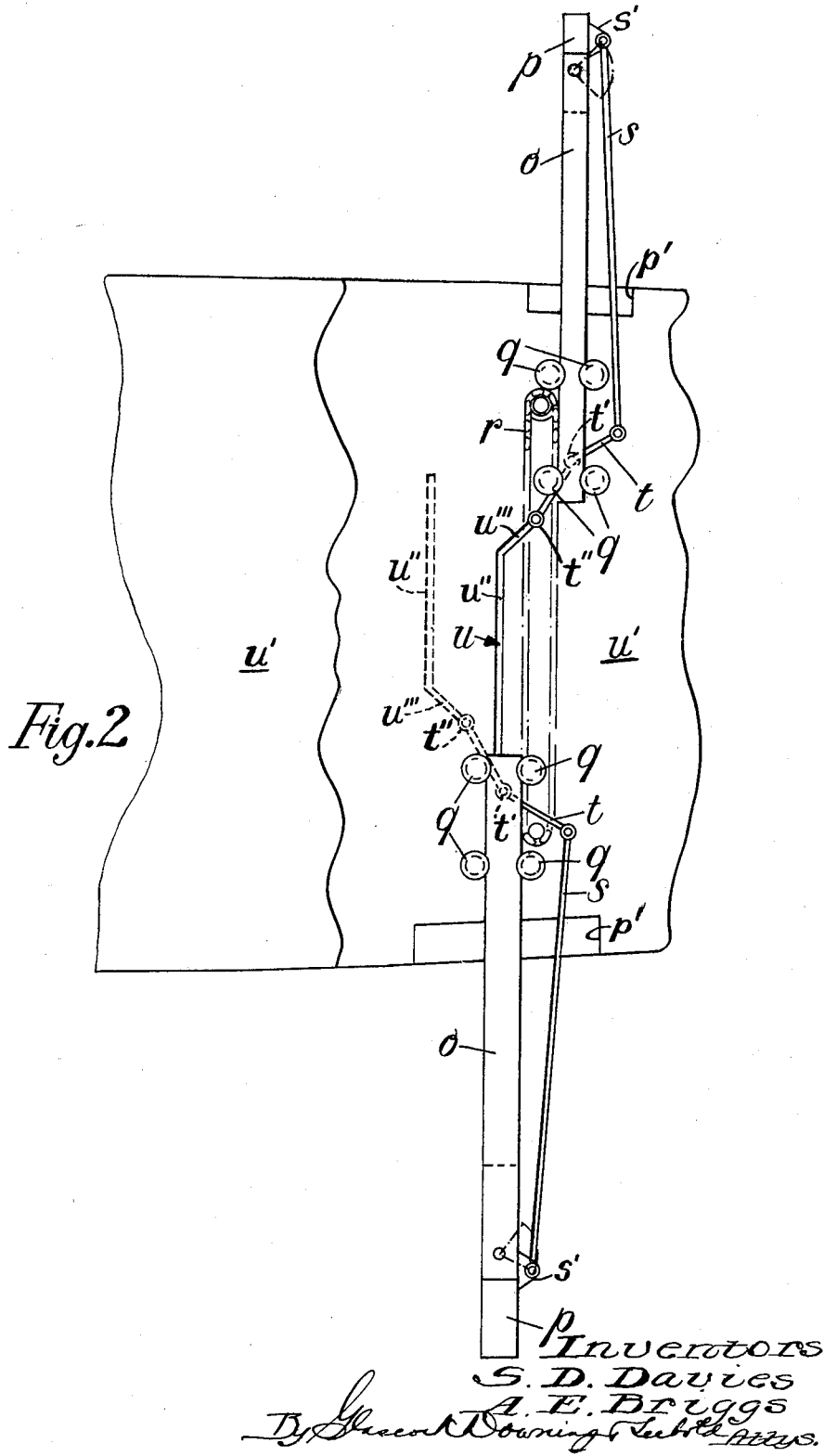
Figure 3:
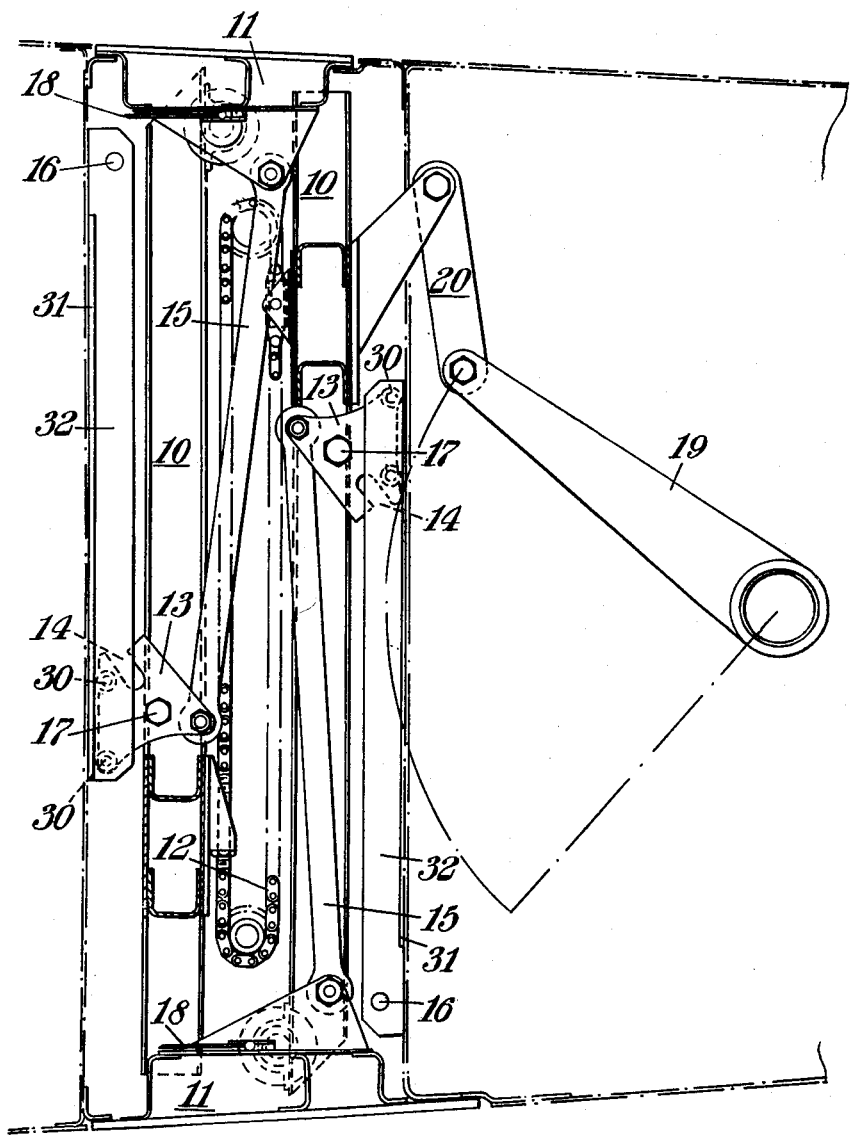
Figure 4:
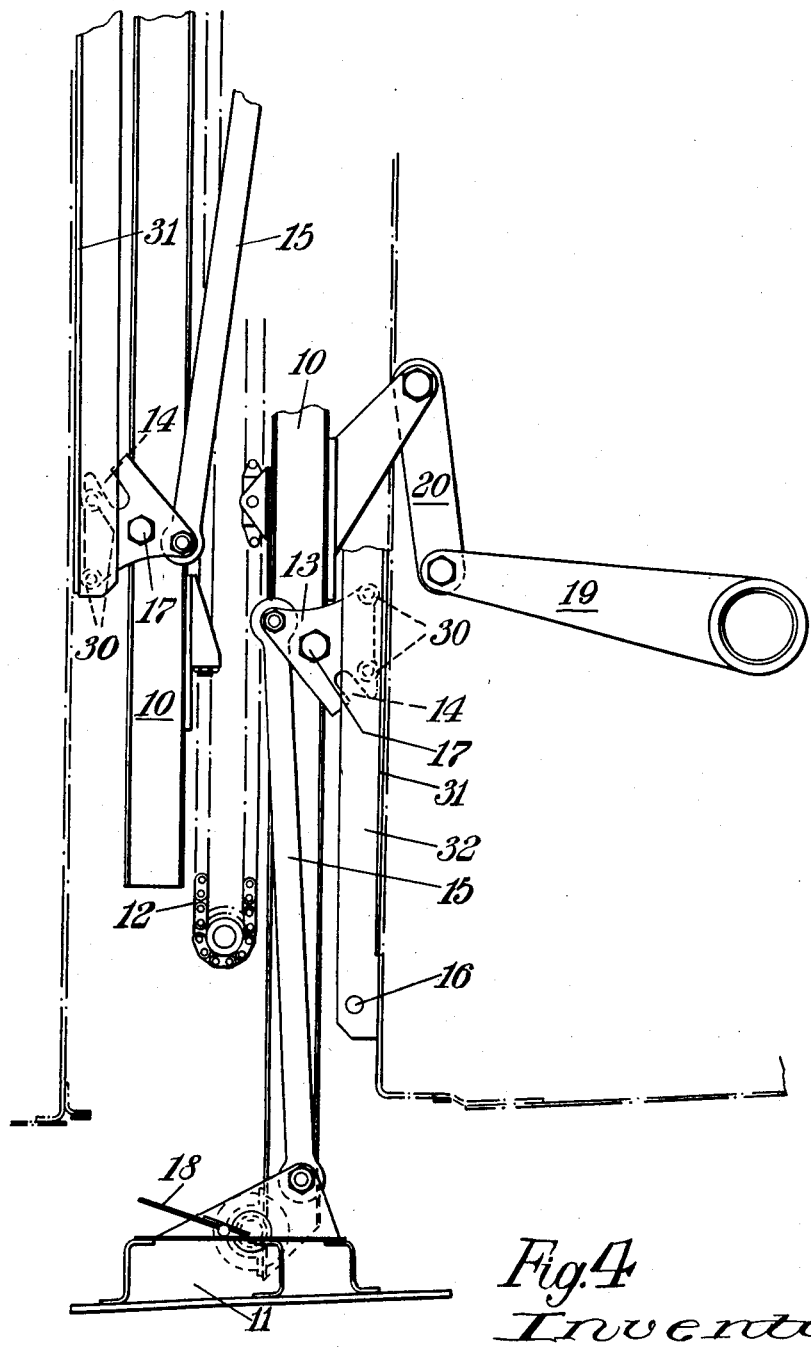
Figure 6:
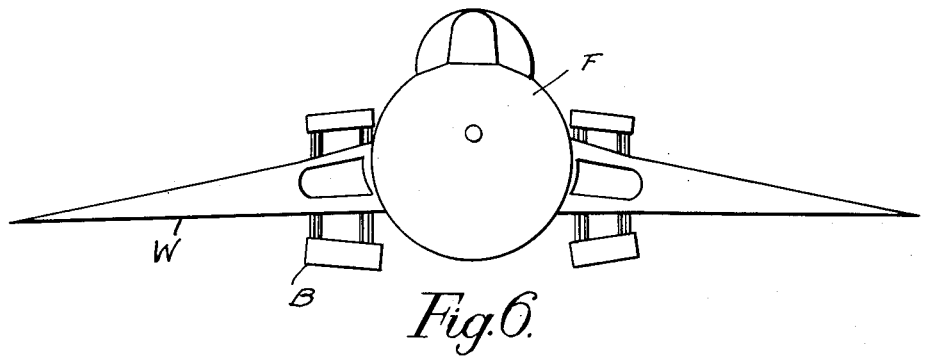
Figure 7:
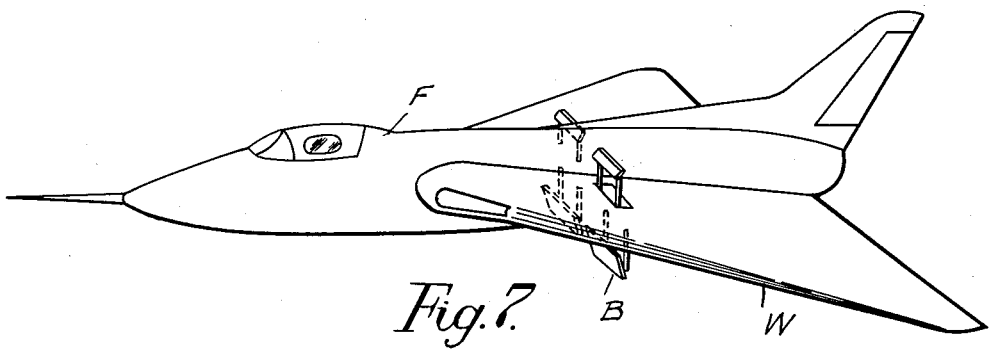

Figure 2 is a diagrammatic view taken at right angles to the structure of Figure 1 and illustrating the brake operating mechanism, Figure 3 illustrates in diagrammatic cross section a modified air brake arrangement, Figure 4 illustrates the arrangement of Figure 3 with one of the brake frame means partly extended from stowed position, Figure 5 is a fragmentary view illustrating the arrangement of Figures 3 and 4 in fully extended position, and Figures 6 and 7 are pictorial views taken at right angles to one another and illustrating an aircraft having the air brake mechanism of the invention applied thereto.

In Figure 1, the aircraft wing X may house fuel tanks or engine air intakes as shown diagrammatically at *a* or other parts not shown, in addition to the air brakes and their operating mechanism. Each air brake includes a frame means comprising a pair of rigid side members *o* carrying at their outer end pivotally mounted brake surface plates or members *p*. As shown in Figure 2, the frame means are guided by rollers *q* which are flanged for straight line movement into and out of the wing relative to the upper and lower surfaces. Endless chains *r* are connected to the respective frame means so that they move in pairs, one frame of one pair moving outwardly of the upper wing surface and the other frame member of each pair moving outwardly of the lower wing surface. A link or rod s is pivotally connected at one end to a bracket s' on each of the brake members p and at its other end each rod is connected to one end of a lever t. Each lever t is pivotally connected at t' to one of the side frame members o of each of the frame means, the other end of each lever t has a projection t'' thereon which engages a slot u. The slots u are formed in vertical components u' extending between the upper and lower wing surfaces and the slots including an elongated straight portion u'' so that during the major portion of the outward movement of each of the frame means the followers or projections t'' move in a straight line path so that the brake surface members p remain in the position parallel with the wing surface that they occupy in stowed position. Housings p' are provided in the respective upper and lower wing surfaces to accommodate the brake surface member. The cam slots have an angular portion u''' which changes the angularity of the levers t as the frame means are further extended so that the levers turn about their respective pivots t' to apply turning force to the brake members p through the rods or links s whereby as shown in Figure 2, when the frame means are fully extended the brake members p are in position substantially in line with the side frame members o and at right angles to the line of flight of the aircraft so as to exert maximum braking effort for low speed flight. If the frame means are extended to an intermediate position between the stowed and fully extended position, the cooperation of the projections t'' with the elongated portion u'' of the cam slot will hold the brake surface members p substantially at right angles to the side frame members o and thus substantially parallel to the line of flight so that a braking effort sufficient for high speed flight conditions will be attained. In other words, the structural arrangement provides controllable braking action by variably extending the frame means. The endless chains r can be operated by any suitable means, not shown, in order to effect extension and retraction of the frame means.

In Figures 3, 4 and 5, the rigid side members 10 to which the brake members 11 are pivotally connecting are interconnected for movement by chains 12 as in the aforedescribed arrangement but the turning of the brake members 11 upon the side members 10 is effected in a different manner as follows. Pivotally mounted upon one of each pair of side members 10 is a plate member 13 which has a slot 14 therein opening toward the wing surface through which the particular side frame member is to move. Each plate member is coupled by a rod 15 to a bracket on a brake member 11. Rollers 30 are mounted on each of the plate members 13 so as to ride upon the respective flanges 32 mounted within the wing. An abutment pin 16 is carried by the outermost portion of each angle bracket 32 and projects into the line of movement of the plate members 13. Each flange 31 is cut away in the region of the pin 16 so that while the rollers maintain the plate members 13 in the position shown in Figure 3 each plate is free to turn about its pivot 17 in the vicinity of pin 16. As the frame members move, part 13 is free to turn about its pivot 17 in the vicinity of the pin 16. As the side members move outwards to project the brakes from their out-of-service position stowed flush with the wing surface, which is the position shown in Figure 3, each of the plate members 13 moves towards the fixed pin or abutment 16 which finally enters the slot 14 and turns the respective plate members 13 about the pivots 17, with the result that the brake members 11 which are pivotally mounted between the side members 10 are turned to a position at right angles to the line of flight and so exert maximum braking effort. At an intermediate position of the side members 10 the brake members are substantially at right angles to the members 10 so that they exert sufficient braking effort for use at high flying speeds.

Figures 3, 4 and 5 also show a modification in which an automatic flap 18 is pivotally mounted upon each main brake. This flap moves to a braking position due to wind pressure, as shown in Figure 4, as soon as the main brake moves clear of the wing and it then exerts a limited braking effort until the main brake moves to its full braking position as shown in Figure 5 when the flap 18 is shielded from the air stream. The flaps 18 can only turn through a limited angle and they are automatically put into an out-of-service condition when the brakes are fully stowed in the wing.

The main brakes of Figures 3, 4 and 5 are operated by jacks or other means through levers 19 and rods 20 as shown in Figure 3, one brake being operated from another through an endless chain.

In all cases the brakes may be slotted, have corrugated surfaces or be otherwise shaped to give best braking conditions.

By mounting each brake on side members spaced apart to receive the brakes between them, we can clear any engine air inlets or the like which may be in the aircraft wing.

It is clear therefore that the present invention provides in an aircraft a brake mechanism for the wing thereof which includes at least two pairs of rigid side frame members each including inner and outer ends, the wings have air brake accommodating apertures through the respective upper and lower surfaces and air brake members are pivotally mounted between the outer ends of the frame members of each pair. Means mount the side frame members for movement between a stowed position within the wing and a service position projecting outwardly of the respective upper and lower surfaces, the mounting means including guide means that constrain the pairs of side frame members to straight line movement between the stowed and service positions.

The invention further includes means operatively connected between the pairs of side frame members for selectively and simultaneously either projecting or withdrawing the pairs of frame members between stowed and service positions.

The invention further includes means for turning the brake members about their pivots between positions approximately parallel with the wing surfaces and positions substantially perpendicular to these surfaces.

It is to be further pointed out that the means that guide the frame means and thus the brake mechanisms for movement into and out of the wing are disposed in planes that are spaced apart in the direction of the line of flight of the aircraft so that when the frame means are in stowed position they are substantially immediately behind one another.

Figures 6 and 7 illustrate in front elevation and in side view respectively an aircraft incorporating the air brake mechanism of the invention. It is to be noted that on each side of the fuselage F and in the wing W are mounted a pair of brake mechanisms B. The brake mechanisms are shown in an extended position with the brake surface members so disposed as to exert substantially maximum braking effect for low speed flight conditions.

What we claim is:

1. In an aircraft, a wing having spaced upper and lower surfaces and air brake accommodating apertures through each surface; air brake mechanism for the wing including at least two pairs of rigid side frame members each including inner and outer ends, an air brake member pivotally mounted between the outer ends of the frame members of each pair, means mounting at least one pair of side frame members for movement between a stowed position within the wing and a service position projected outwardly of the upper wing surface and substantially perpendicular thereto, means mounting at least one pair of side frame members for movement between a stowed position within the wing and a service position projected outwardly of the lower wing surface and substantially perpendicular thereto, both said last two mentioned means including guide means for constraining the pairs of side frame members to straight line movement between stowed and service positions, means operatively interconnected between the pairs of side frame members for selectively and simultaneously projecting and withdrawing the pairs of frame members between stowed and service positions, means for turning said brake members about their pivots between positions parallel with the wing surfaces and positioned substantially perpendicular thereto, and said last mentioned means including means operative to dispose said brake members flush with the upper and lower wing surfaces when the pairs of side frame members are stowed.

2. In an aircraft as defined in and by claim 1, in which the means operatively interconnected between the pairs of side frame members for selectively and simultaneously projecting and withdrawing the same includes at least one endless chain.

3. In an aircraft as defined in and by claim 1, and a pair of abutments mounted within the wing and respectively disposed adjacent the upper and lower surfaces, the means for turning the brake members about their pivots including a pair of links, means connecting one end of each link to a brake member, a plate member pivotally mounted to one frame member of each pair of frame members, means pivotally connecting the opposite end of each link to a plate member, said plate member having a slot therein and being movable with the side frame members in their movement to service position, said abutments being disposed in the path of movement of said plate members and operative to engage the slots so that when the side frame members are approaching service position the plate members engage the abutments and are thereby turned to impart movement to the links to effect pivoting movement of the brake members.

4. In an aircraft as defined in and by claim 1, and a flap mounted on each brake member for limited pivoting movement about an axis perpendicular to the line of movement of the side frame members and operable to pivot under wind pressure when the side frame members are moving to service position and to constitute an auxiliary brake.

5. In an aircraft as defined in and by claim 1, and a pair of abutments mounted within the wing and respectively disposed adjacent the upper and lower surfaces, the means for turning the brake members about their pivots including a pair of links, means connecting one end of each link to a brake member, a plate member pivotally mounted to one frame member of each pair of frame members, means pivotally connecting the opposite end of each link to a plate member, said plate member being movable with the side frame members in their movement to service position, said abutments being disposed in the path of movement of said plate members so that when the side frame members are approaching service position the plate members engage the abutments and are thereby turned to impart pivoting movement to the brake members.

6. In an aircraft air brake structure including in combination with a wing having means providing spaced upper and lower airfoil surfaces each having an aperture therein, at least one pair of oppositely movable rigid frames each including parallel side members, means mounting the frames within the wings for movement in opposite directions respectively outward and inward of the respective upper and lower surfaces including guide means constraining each frame for movement in an in-line direction relative to the said surfaces and which guide means are spaced with respect to one another so that the frames move in parallel planes, said frames including inner and outer ends, an air brake member pivotally mounted between the outer ends of each pair of side members, means for simultaneously moving the frames outwardly of the wing surfaces to a service position and inwardly of the surfaces to a towed position, and means connected to the brake members and responsive to the movement of the frames for pivoting the brake members from a normal position in the apertures in the surfaces and lying flush with said surfaces to a service position extending substantially perpendicular to the respective wing surfaces and said last mentioned means pivoting said brake members only after a predetermined movement has been imparted to the frames whereby the frames can be moved outwardly of the wing surfaces with the air brake members substantially parallel to said surfaces to provide braking action at high speeds and said frames can be moved outwardly to fully extended service position and said air brake members are thereby pivoted to positions substantially perpendicular to said surfaces to provide air brake action at low speed of the aircraft.

7. In an aircraft as defined in and by claim 1 and plate members extending between the upper and lower surface of the wing and mounted adjacent at least one of the side frame members of each pair, said plate members having cam slots therein, a lever pivoted upon one side frame member of each pair and adjacent one of the said plate members, means on each lever engaging the cam slot on the adjacent plate member, the means for turning the brake members about their pivots including means extending between each brake member and the lever mounted on the associated side frame member, the cam slots having successive portions at angles to one another and including a portion perpendicular to the wing surface so that when the side frame members are in stowed position the disposition of the levers relative to the cam slots has turned the brake members to a position to lie flush with the respective upper and lower wing surfaces and in extending the side frame members the co-operation between the means on each lever and the cam slots being such that while the means on the levers engaged in the cam slots are in the portions of the slots that are perpendicular to the wing surfaces the brake members remain in their originial positions and when the means on the lever move in the angular portions of the cam slots the brake members are turned into positions at right angles to the line of flight.

8. A brake mechanism for an aircraft wing structure comprising on each side of the aircraft fuselage and within the wing a pair of frame means extending generally perpendicular to the wing surfaces, the respective upper and lower wing surfaces having air brake accommodating apertures therein, means mounting the frame means of each pair for straight line movement out of and into the wing in parallel planes, each frame means including spaced side members, an air brake surface member pivotally mounted between the side members of each frame means, means for moving each pair of frame means simultaneously in opposite directions so as to selectively extend or retract the frame means, linkage mechanism connected to the respective brake surface members and operably coupled with the frame means, and means for moving the linkage mechanism responsive to the respective extending and retracting movements imparted to the frame means to turn the brake surface members from a position parallel to the wing surfaces to a position substantially perpendicular to the same.

References Cited in the file of this patent

UNITED STATES PATENTS

| 1,545,808 | Ajello | July 14, 1925 |
| 1,731,735 | Aten | Oct. 15, 1929 |
| 1,818,067 | Kookogey | Aug. 11, 1931 |
| 2,041,688 | Barnhart | May 26, 1936 |

FOREIGN PATENTS

| 708,447 | Germany | July 21, 1941 |
| 709,558 | Germany | Aug. 20, 1941 |